(No Model.) 2 Sheets—Sheet 2.
N. V. MOORE.
CORN PLANTER.
No. 578,256. Patented Mar. 2, 1897.
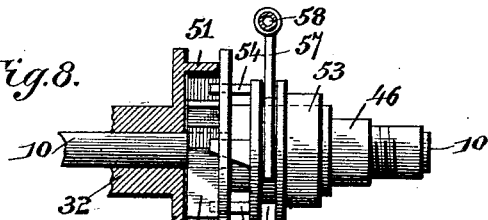
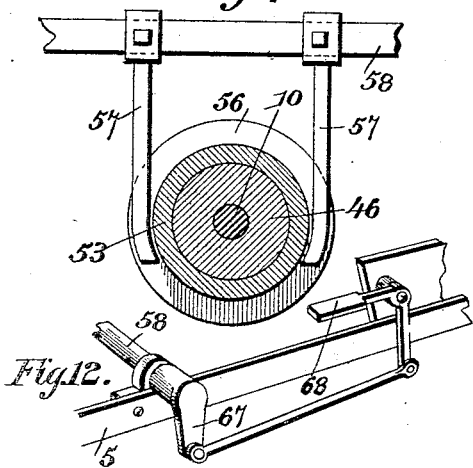
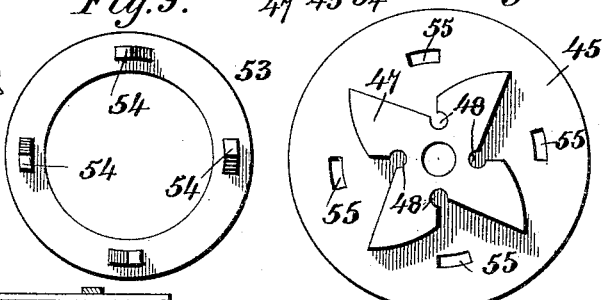
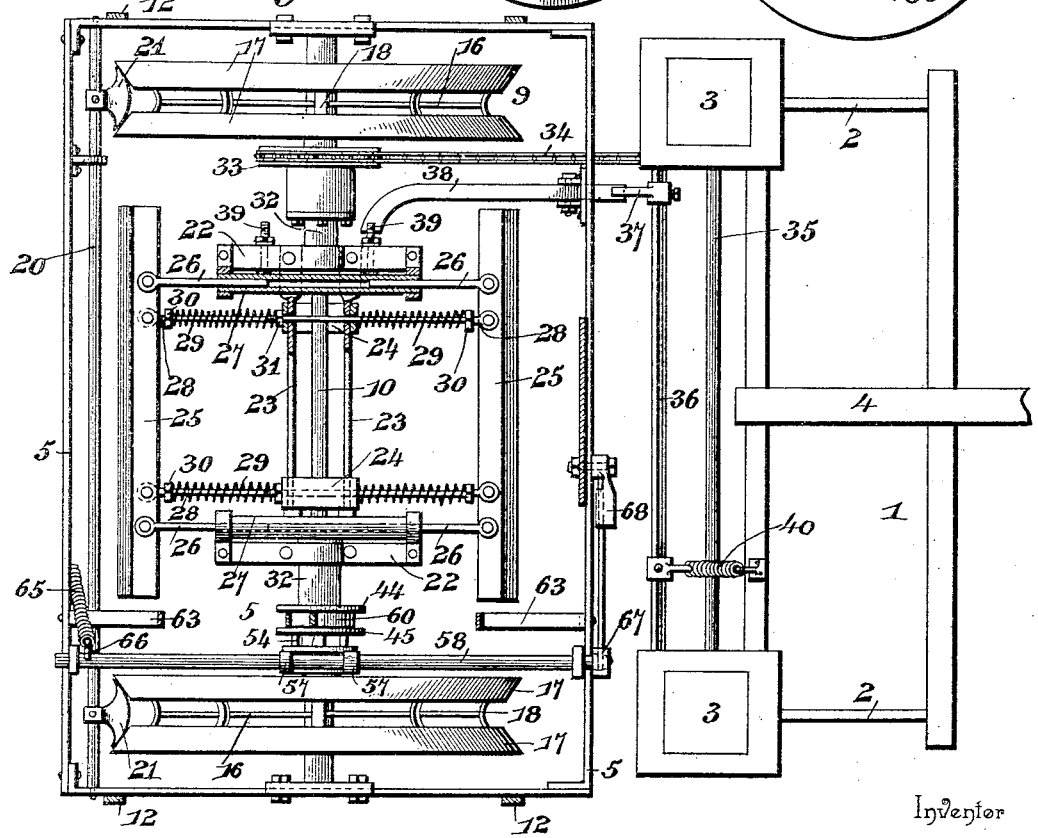
Witnesses
Jas. K. McCathran
V. B. Hillyard
Inventor
Nathaniel V. Moore
By his Attorneys,
C. A. Snow & Co.

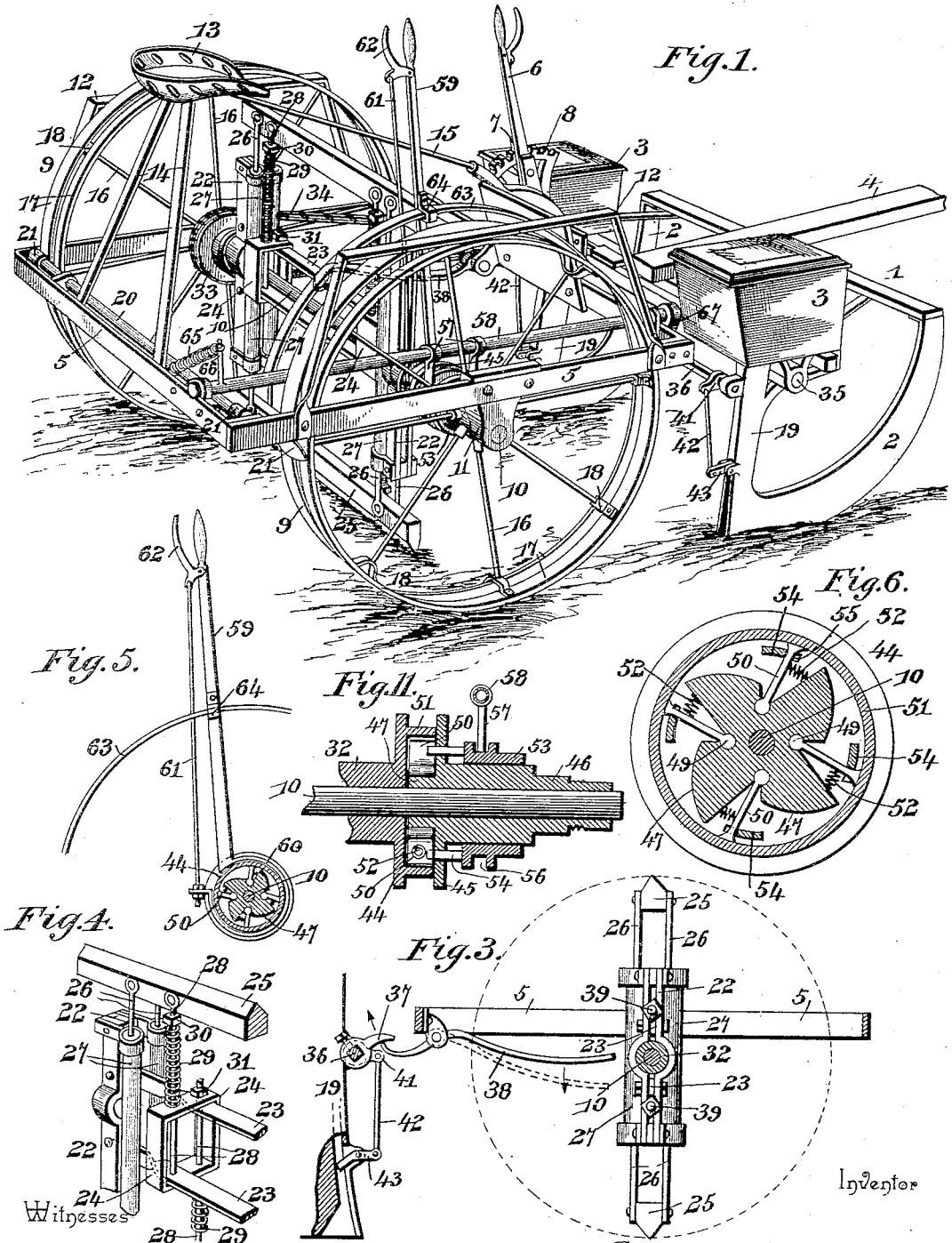

UNITED STATES PATENT OFFICE.

NATHANIEL VEST MOORE, OF YATES CENTRE, KANSAS.

CORN-PLANTER.

SPECIFICATION forming part of Letters Patent No. 578,256, dated March 2, 1897.

Application filed March 17, 1896. Serial No. 583,592. (No model.)

*To all whom it may concern:*

Be it known that I, NATHANIEL VEST MOORE, a citizen of the United States, residing at Yates Centre, in the county of Woodson and State of Kansas, have invented a new and useful Corn-Planter, of which the following is a specification.

This invention relates to planters for dropping seed in check-rows without the employment of the ordinary check wire or cord. The primary feature is the provision of means for alining the machine, whereby the seed may be sown in lines irrespective of the character of the ground. When the ground is rough, rolling, or has depressions, the machine will soon get out of line, and to counteract this evil it is necessary to adjust both the marking provisions and the seed-dropping mechanism. This the present invention aims to effect in a simple and convenient way.

Another object in view is to combine with the planter a marker which will indent the soil and accurately indicate the hills, yield to prevent straining of the parts or injury to the machine, capable of being moved forward or backward at the will of the attendant, and which will be easy-running and not add materially to the weight and draft of the machine.

Other objects, such as light draft, positiveness of action, ease and convenience of adjusting the machine while in motion, reliability of action, durability, and effectiveness, are contemplated and attained by the machine herein disclosed.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a planter especially designed for attaining the objects of this invention. Fig. 2 is a top plan view thereof, parts being broken away. Fig. 3 is a detail view showing the relative disposition of the parts for transmitting motion from the marker to the seed-dropper. Fig. 4 is a detail perspective view showing the manner of mounting and constructing the marker, whereby it is capable of yielding when meeting with a boulder, root, or other hard and unyielding substance. Fig. 5 is a detail view of the clutch between the marker and the drive-wheel, showing the clamp-lever which coöperates therewith to throw the marker forward or backward. Figs. 6, 7, 8, 9, 10, and 11 are detail views of the clutch and the component parts thereof by means of which the marker and the seed-dropping mechanism are thrown into and out of gear. Fig. 12 is a detail view of the instrumentalities for throwing the clutch out of gear.

Corresponding and like parts are referred to in the following description and designated in all the views of the accompanying drawings by the same reference-characters.

The planter comprises the usual draft or runner frame 1, which is mounted upon runners 2 and supports the hoppers 3 and the pole or tongue 4, and the main or wheel frame 5, the two frames being flexibly connected in any of the ordinary ways, so that the draft-frame can be adjusted to cause the runners 2 to penetrate to a greater or less depth into the ground when the machine is in operation, a lever 6 being provided to effect the desired adjustment, and having its hand-latch 7 constructed to engage with a notched segment 8 to secure the parts in the located position.

The main frame 5 is substantially rectangular in form and is mounted upon ground-wheels 9, which are loosely fitted upon an axle 10, supported at its ends in hangers 11. The ground-wheels are located within the side bars of the frame, and fenders 12, consisting of arched bars, are secured at their lower ends to the side bars of the frame and prevent any obstacle from coming in engagement with the ground-wheels. The seat 13 is supported about over the axle, so that the weight of the driver may be utilized to hold the machine to its work and cause the markers to indent the soil. This seat is secured to the upper end of braces 14 and is strengthened by a brace 15, extending forwardly and having connection with the front end of the main frame.

The ground-wheels are similarly constructed and comprise spokes 16 and companion rims 17, the latter being disposed in coincident relation and spaced apart at their inner edges and oppositely flaring, whereby the ground-wheels appear as if constructed with grooved or channeled peripheries. Yokes 18 are secured at a middle point to the outer extremities of the spokes and are connected at their extremities with the rims 17 and serve to brace the latter and hold them in fixed relation. These yokes are inwardly depressed or curved between their terminals, so as to span the space formed between the inner or opposing edges of the rims 17. The ground-wheels are disposed to track in the path of the runners 2, so as to serve as coverers to throw the earth upon and compact it about the seed. The spaces between the inner edges of the rims come directly in line with the seed-spouts 19, thereby preventing the packing of the earth directly over the seed, which would have a tendency to retard germination and bury the seed too deep into the soil. A rod 20 is located in the rear of the ground-wheels and is supplied near its ends with blades 21, which approach close to the rims of the ground-wheels and act as scrapers to remove earth, roots, &c., which may cling thereto, thereby preventing the choking of the space between the companion rims and the clogging of the ground-wheels.

In its organization the marker embodies end pieces 22, transverse bars 23, frames 24, connecting the transverse bars 23 near their ends, indenting-bars 25, guide-rods 26, having connection at their outer ends with the indenting-bars, guides or tubes 27 for the guide-rods 26 to operate in, direction-rods 28, having connection at their outer ends with the indenting-bars and having their inner ends operating in the frames 24, and springs 29, mounted upon the direction-rods 28 and confined between the ends of the frames 24, and adjusting-nuts 30, located upon the direction-rods 28 near their outer ends, said adjusting-nuts 30 regulating the tension of the springs 29 to cause the indenting-bars to exert a greater or less pressure against the soil, depending upon the tension of the springs 29, as will be readily understood. The inner ends of the direction-rods 28 pass through the opposite ends of the frames 24, and their projecting ends are threaded and nuts 31 are mounted thereon, so as to limit the outward movement of the indenting-bars, whereby their depth of penetration into the soil is regulated. The end pieces 22 are composed of similar members, which are bolted together and which are oppositely deflected at a middle point in their length to fit about sleeves 32, loosely mounted upon the axle 10 and which form bearings for the marker. The indenting-bars 25 are V-shaped at their outer edges, so as to easily penetrate the soil and provide an indentation which will clearly indicate the position of the seed.

A sprocket-gear 33 is loosely mounted upon an end portion of the axle 10, and its hub is bolted or otherwise secured to the flanged end of the adjacent sleeve 32 and is thereby caused to revolve in unison with the marker. A sprocket-chain 34 connects the sprocket-gear 33 with the shaft 35 in such a manner as to rotate the latter to cause the seed to pass from the hoppers 3 into the grain-spouts 19, the said shaft 35 being disposed in the ordinary way, so as to effect the discharge of the seed in the manner set forth.

A rock-shaft 36 obtains bearings in lugs projecting in the rear of the grain-spouts 19 and is provided with a tappet 37, which extends within the path of a lever 38, actuated by means of projections 39, extending laterally from an end of the marker and by means of which the said rock-shaft is operated, a spring 40 connecting an arm of the rock-shaft with a convenient portion of the frame, so as to return the rock-shaft to a normal position after being actuated. Radius-arms 41, secured to the rock-shaft near its ends, are connected by links 42 to valves 43, controlling the passage through the grain-spouts, so as to release the grain at the proper moment, whereby the seed will be planted so that its position will be accurately indicated by the marker. It will be noted that the dropping of the seed is controlled solely by the movements of the marker and that when the latter is inactive no seed is planted. Hence the planting is solely dependent upon the operation of the marker and can be regulated so as to have the seed sown in check-rows by a proper adjustment of the marker, as will be readily understood.

The power for actuating the marker and seed-dropping mechanism is derived from one of the ground-wheels, and in order to provide for the alining of the machine and the throwing of the same into and out of gear a clutch mechanism is interposed between the marker and the ground-wheel resorted to for operating the several mechanisms, and, as shown, this clutch mechanism consists of a flanged disk or plate 44, loosely mounted upon the axle 10 and firmly secured to the adjacent sleeve 32, so as to revolve with the marker. A companion plate or disk 45 is loosely mounted upon the axle 10, and is secured to a sleeve or hub portion 46 of the ground-wheel for operating the machine, and which will be referred to hereinafter and in the subjoined claims as the "drive-wheel." An enlargement 47 is provided or formed on the inner face of the plate or disk 45, and enters the space inclosed by the lateral flange or rim of the part 44, and has circular seats 48 in its edge equidistant from the opening through which the axle 10 passes, and which receive the cylindrical enlargements or heads 49 at the inner ends of pawls 50, which are interposed between the part or center 47 and inner periphery of the rim or flange 51 of the part 44. The outer ends of the pawls 50 are expanded to obtain an extended bearing against the inner side of the rim 51, and springs 52 are placed between the said pawls and the center 47 to force the expanded ends of the pawls into engagement with the rim 51, so that the parts 44 and 45 will under normal conditions revolve together. The edges of the center 47 are cut away opposite the circular seats 48 to afford clearance to the pawls 50 and admit of the latter having an arcuate movement about their cylindrical heads 49, whereby their outer ends may be brought into or out of engagement with the rim 51, according as it is required to throw the machine into or out of gear. These cut-away portions flare as they recede from the circular seats 48 to provide for ample movement of the pawls in the manner set forth. A sleeve 53 is mounted upon the sleeve 46 and is adapted to move thereon to and from the plate or disk 45, and has a series of tapering projections 54 extending therefrom and adapted to operate through slots 55 in the plate or disk 44, so as to disengage the pawls 50 from the rim 51 when it is required to throw the machine out of gear. An annular groove 56 in the sleeve 53 receives a shipper 57, having connection with a longitudinal shaft 58, journaled at its ends in bearings provided on the front and rear bars of the main frame. By this means the sleeve 53 is actuated to throw the machine into or out of gear. By moving the sleeve 53 toward the parts 44 and 45 the tapering projections 54 will move through the slots 55 and engage with the pawls 50 and move the latter against the tension of the springs 52 and disengage them from the rim 51, thereby throwing the parts of the clutch out of gear. At this time the marker can be moved forward or backward, as desired, to cause the planting to be effected in check-rows, and in order to accomplish this end in a convenient way a lever 59 is provided, and is supplied at its lower end with a clamp-band 60, which encircles the rim 51, and whose extremity is connected by a rod or wire 61 with a hand-latch 62 at the upper end of the lever 59, and by means of which the clamp-band is caused to grip the rim 51, when required, so as to move the marker either forward or backward, as desired, said lever being guided in its movements by a curved bar 63, operating through a keeper 64, attached to the side thereof. After the machine has been alined the hand-latch 62 is released, when the clamp-band will loosen its grip upon the rim 51. At this moment the shaft 58 is released, and a spring 65, having connection with an arm 66, will regain itself and move the sleeve 53, so as to withdraw the projections 54 from engagement with the pawls 50, after which the springs 52 will cause the pawls to bear against the rim 51 and thereby throw the machine in gear. A crank 67 is provided at the front end of the shaft 58 and is connected with a foot-lever 68, which latter when pressed upon will turn the shaft 58 against the tension of the spring 65 and move the sleeve 53, so as to throw the clutch out of gear. Under normal conditions the machine is in gear, and the sleeve 53 is held at the limit of its outward movement by means of the spring 65, as will be readily understood.

Having thus described the invention, what is claimed as new is—

1. In a planter, the combination with the seed-dropping mechanism comprising valves in the grain-spouts, a rock-shaft operatively connected with the valves, a tappet mounted upon the rock-shaft, and a spring for returning the rock-shaft and attached parts to a normal position, of a marker having projections, a lever adapted to engage with the tappet of the rock-shaft and extending within the path of the marker projections, a drive-wheel, and a clutch between the marker and drive-wheel for throwing the parts into and out of gear, substantially as and for the purpose set forth.

2. In a planter, the combination with the seed-dropping and marking mechanisms, and a drive-wheel, of a clutch comprising a plate having an annular rim or flange projecting from one side, a companion plate having a center or enlargement to extend within the space inclosed by the aforesaid annular rim, spring-actuated pawls carried by the said center and adapted to bear outwardly against the said annular rim, a sleeve movable to and from the plates and having tapering projections to be projected across the path of the pawls to disengage them from the rim, and actuating mechanism for the said sleeve, substantially as set forth.

3. In a planter, the combination with the planting and marking mechanisms, of a drive-wheel, and a clutch, the latter comprising a plate having a lateral rim, a companion plate, spring-actuated pawls carried by the last-mentioned plate and adapted to engage with the rim of the first-mentioned plate, and a sleeve movable to and from the plates and having tapering projections to be projected across the path of the spring-actuated pawls to disengage them from the said rim, substantially in the manner and for the purpose set forth.

4. In a planter, the combination with the seed-dropping and marking mechanisms, of a drive-wheel, and a clutch, the latter embodying a plate having a lateral rim, a companion plate having a center to enter the space inclosed by the rim and provided with a series of circular seats and outwardly-flaring cut-away portions, pawls having cylindrical heads which obtain bearings in the said circular seats and having their outer ends expanded and adapted to bear against the inner side of the rim, springs for holding the pawls in engagement with the rim, and a sleeve movable to and from the plates and having tapering projections to operate through openings in one of the plates to engage with the pawls and release them from the said rim, substantially as and for the purpose set forth.

5. A marker for planters, comprising in combination end pieces connected together in a substantial manner, guides having firm connection with the end pieces, indenting-bars, guide-rods having connection with the indenting-bars and operating in the said guides, direction-rods operatively connected with the indenting-bars, and springs supported by the direction-rods and adapted to force the indenting-bars into the ground and admit of their yielding when meeting with an unyielding obstruction, substantially as and for the purpose set forth.

6. A marker for planters, comprising the following elements in combination: connected end pieces, frames having connection with the end pieces, indenting-bars, direction-rods having attachment with the indenting-bars and operating through the frames, and having their projecting ends threaded and supplied with nuts by means of which the outward movement of the indenting-bars is regulated, springs mounted upon the outer portions of the direction-rods, and adjusting-nuts for varying the tension of the said springs, substantially in the manner set forth for the purpose described.

7. The herein-described marker, comprising end pieces, transverse bars connecting the end pieces, frames supported by the transverse bars, guides secured to the end pieces, rods operating in the guides and having connection at their outer ends with indenting-bars, direction-rods operating through the frames and provided with means to limit their outward movement, indenting-bars having connection with the direction-rods, springs mounted upon the outer portion of the direction-rods, and means for adjusting the tension of the springs, substantially as and for the purpose set forth.

In testimony that I claim the foregoing as my own I have hereto affixed my signature in the presence of two witnesses.

NATHANIEL VEST MOORE.

Witnesses:
IRA N. GARDINER,
JAS. L. MARTIN.